United States Patent [19]
Smith et al.

[11] Patent Number: 6,136,189
[45] Date of Patent: Oct. 24, 2000

[54] ENHANCED IN-BOTTLE FILTRATION MECHANISM AND TECHNIQUES

[75] Inventors: Rose C. Smith, New York, N.Y.; John E. Nohren, Clearwater, Fla.

[73] Assignee: Innova Pure Water Inc., Clearwater, Fla.

[21] Appl. No.: 09/008,845

[22] Filed: Jan. 20, 1998

[51] Int. Cl.⁷ .................................................. B01D 27/14
[52] U.S. Cl. ........................ 210/266; 210/282; 210/502.1; 210/504
[58] Field of Search ..................................... 210/266, 282, 210/418, 485, 489, 502.1, 504, 505

[56] References Cited

U.S. PATENT DOCUMENTS

| | | | |
|---|---|---|---|
| 3,327,859 | 6/1967 | Pall | 210/282 |
| 4,104,170 | 8/1978 | Nedza | 210/487 |
| 4,753,728 | 6/1988 | VanderBilt et al. | 210/282 |
| 4,769,144 | 9/1988 | Nohren, Jr. | 210/282 |
| 5,211,973 | 5/1993 | Nohren, Jr. | 426/82 |
| 5,431,813 | 7/1995 | Daniels | 210/282 |
| 5,545,315 | 8/1996 | Lonneman | 210/120 |
| 5,609,759 | 3/1997 | Nohren, Jr. et al. | 210/266 |
| 5,653,878 | 8/1997 | Reid | 210/266 |

FOREIGN PATENT DOCUMENTS

WO 97/17270  5/1997  WIPO .

OTHER PUBLICATIONS

"Taste Machine Sport Bottle Filtration Straw", flyer, 1995.
Innova "Sport Bottle Water Filter" package, 1994.
Porex "Advantages of the Porex Carbon Block Cartridge Versus Other Carbon Cartridge Constructions", Sep. 1993.
Porex Technologies brochure 1989.
"Oasis Water Purification System" brochure, 1995.

*Primary Examiner*—Ivars Cintins
*Attorney, Agent, or Firm*—Nixon & Vanderhye P.C.

[57] ABSTRACT

A filter assembly for use with a bottle having a circular cross-section neck or open end includes a fine filtration media having a mean pore size of about 1–3 microns and capable of removing contaminants of 3–4 micron size and larger, and an inner filtration media disposed radially inward of the fine filtration media. The inner filtration media includes activated carbon, preferably a porous activated carbon/plastic matrix having a porosity of between about 10–150 microns. The outer housing contains the fine filtration media and the inner filtration media, and is dimensioned to pass through the neck or open end of the bottle. The fine filtration media preferably comprises sheets on opposite faces of a microfiber filter media formed of glass microfibers of varying cross-sectional diameters, with the fine filtration media in a pleated or accordion configuration. A filter assembly may also be provided having a spring pressed straw. The filter assembly may also include a generally tubular plastic housing with a number of ribs each having an inner surface and an outer surface at least 50% larger than the inner surface. The filter element may also be provided comprising a porous rigid matrix of at least 35% activated carbon, styrene, and metal removing polymer bound to the styrene. Also the filter assembly may have a filter element housing extending upwardly from and operatively connected to a cap and having a maximum cross-sectional area at least 20% larger than the cap top area, for example in the form of a disc or a sphere. The filter may be formed by mating hemispherical portions, and the housing may have a novelty configuration.

31 Claims, 12 Drawing Sheets

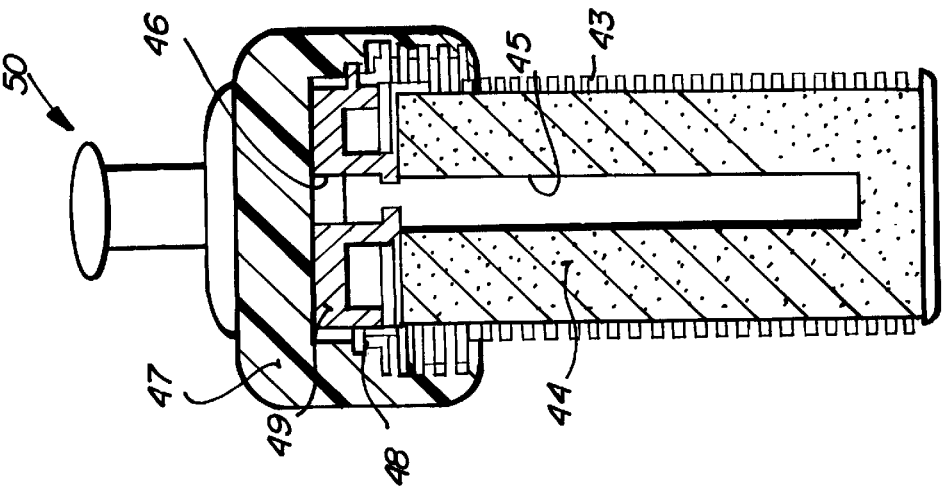
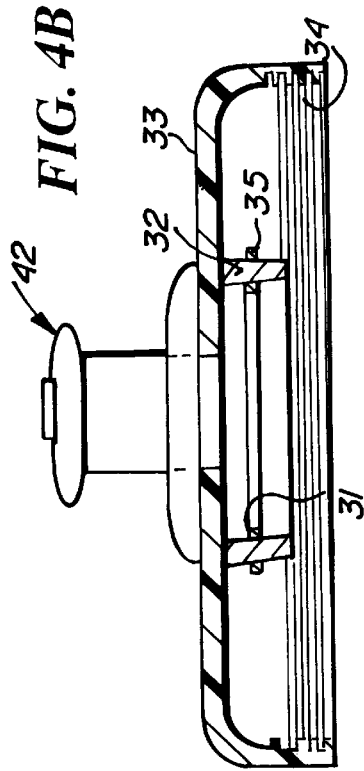
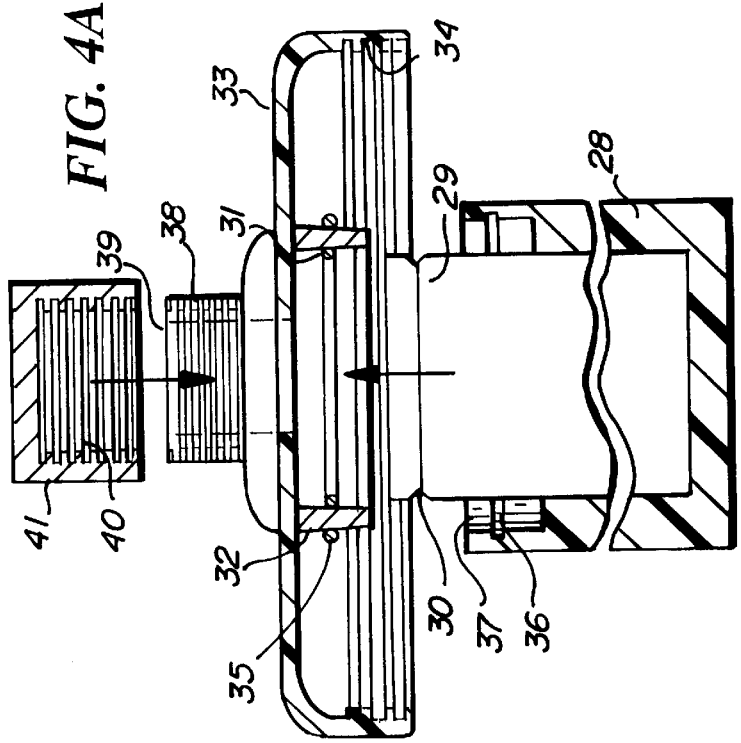

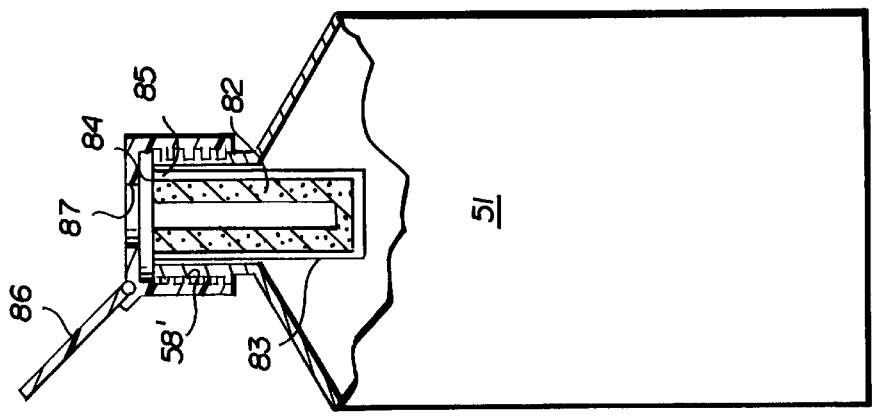
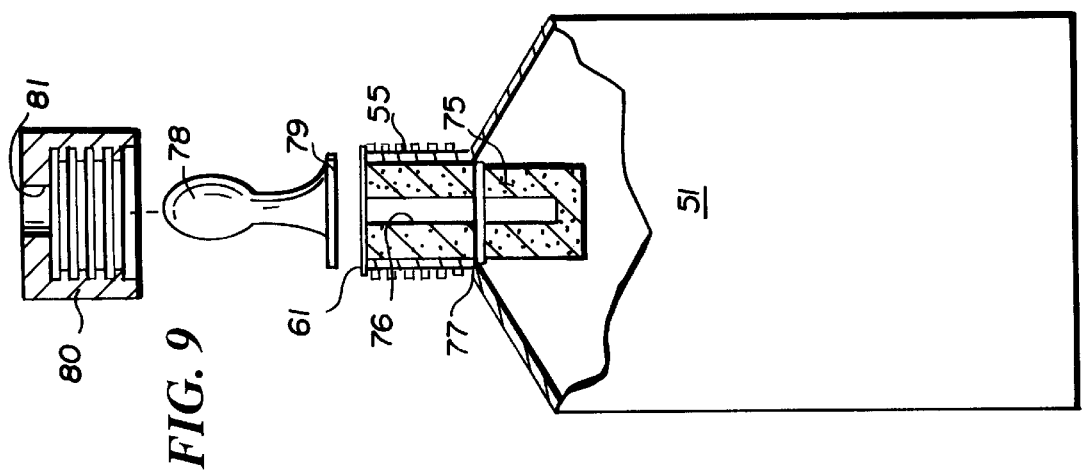
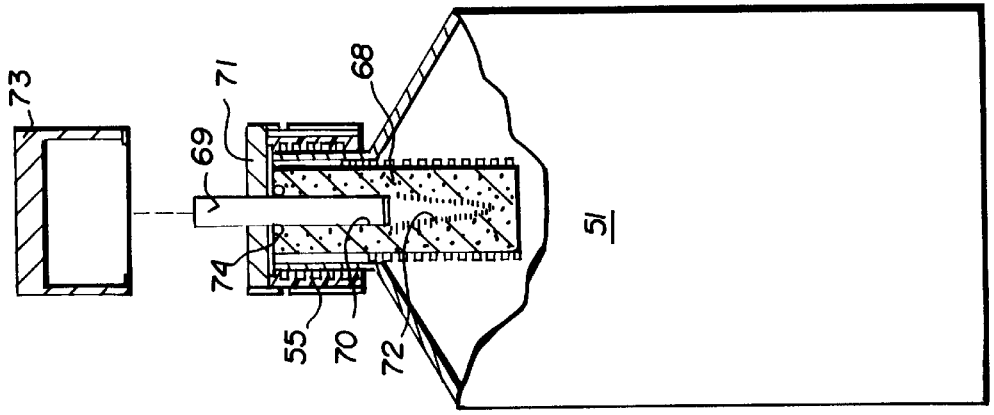

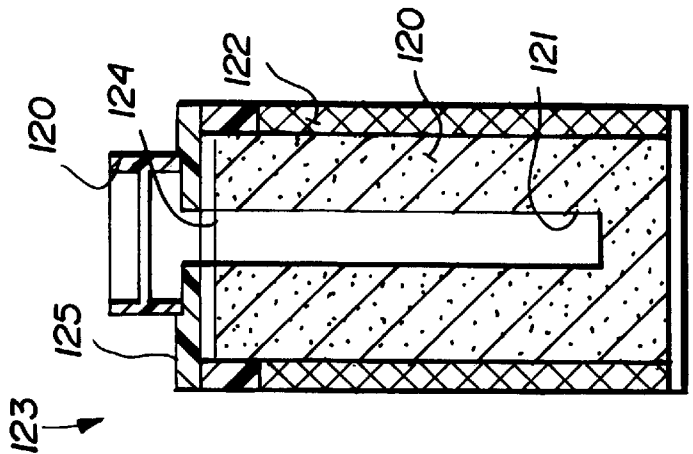
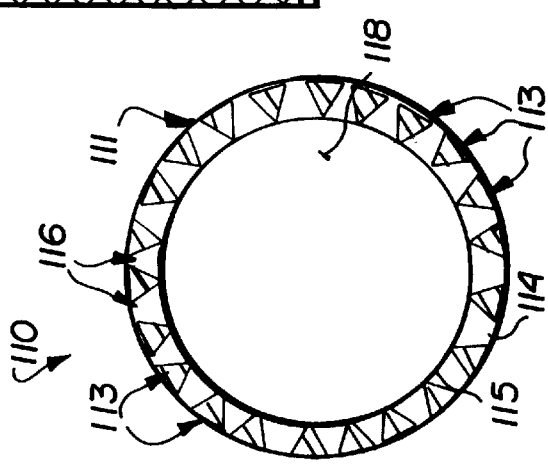
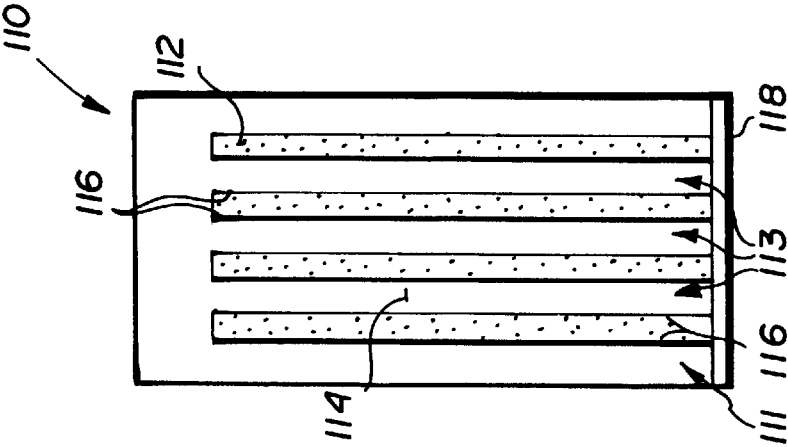
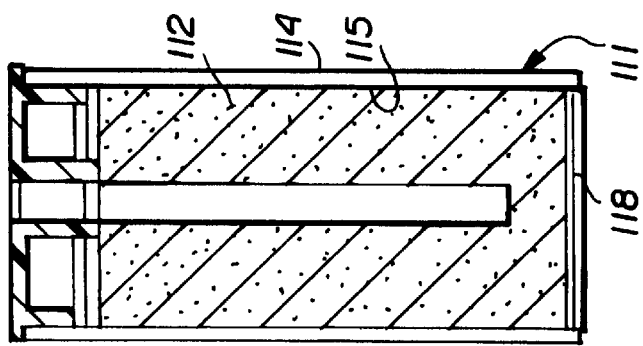

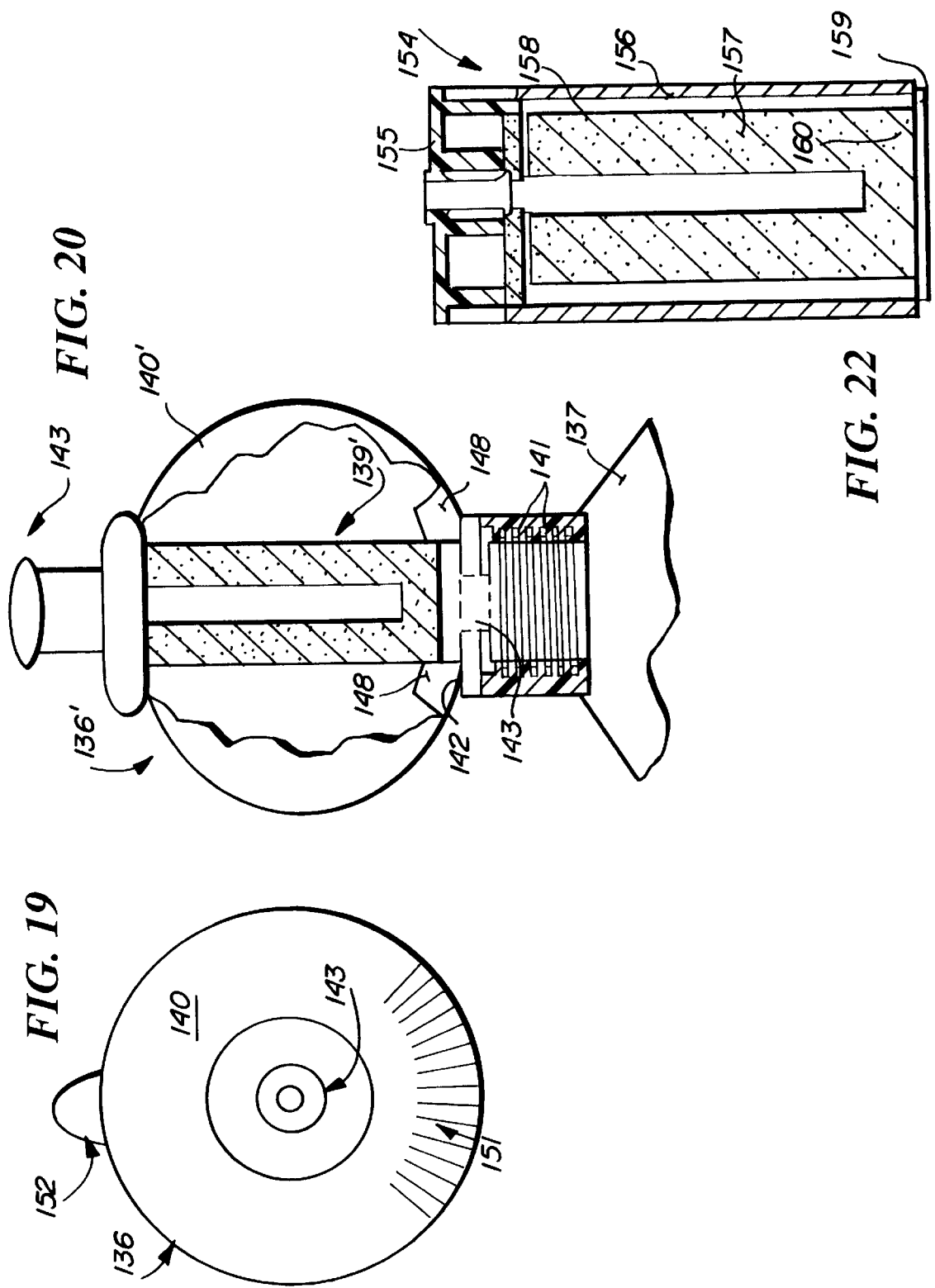

ENHANCED IN-BOTTLE FILTRATION MECHANISM AND TECHNIQUES

BACKGROUND AND SUMMARY OF THE INVENTION

The invention is related to that described in U.S. Pat. No. 5,609,759 (the disclosure of which is hereby incorporated by reference herein). The invention is an extension and refinement of the technology disclosed in U.S. Pat. No. 5,609,759, which allows utilization of an effective but simple bottle mounted filtration assembly.

Over the past several years it has become apparent in industrialized countries that the water supply from many municipal sources contains contaminants which may be of a chemical or heavy metals nature, as well as biological, which heretofore had primarily been associated with developing nations or the third world countries. It has been discovered that chlorine used to treat water against biological disease bearing organisms has been recently shown to be a potential carcinogen and has also been associated with heart related diseases. Thus, it is desirable to remove chlorine, or chlorine by-products, such as chloramines, from drinking water prior to human consumption.

Also, as society has become more mobile and people relocate the differences in the "taste" of locally supplied water frequently differs from the familiar taste of the water where one grew up. Thus, more people have been purchasing bottled water to obtain what they perceive as good tasting water as well as a way to escape contamination.

The invention disclosed herein addresses these needs, in particular the simple and inexpensive production of good tasting, treated water away from home through the use of portable, easily carried, personal water bottles containing water treatment filters, and the manner by which such filters are attached to the bottle. The filters may be integrated with relatively small bottles from 6 ounce to 2 liter in size, e.g. conventional bottled water sizes, and what have become to be known as sport and bike bottles. Typically the neck size is 28 mm for the standard bottled water bottle, to 63 mm for wide mouth bike or sport bottles. While not limited to this size or type range, they represent the bottles most adaptable to the inventions described herein.

As an extension of this technology it is also adaptable to baby and child bottles, and adapted to remove harmful contaminants. Thus, a portable refillable product, reusable for a month or more, and capable of treating up to seventy gallons, or more, can be provided, along with one or several functions or benefits: i.e., filtration for taste and odor, to remove lead and other metallic impurities, to remove protozoa cysts, and lastly to devitalize bacteria and viruses.

To accomplish the above, several designs have been developed, each with its specific purpose and application. In most instances combined with a unique filter as well as a unique mount, valve and closure to affix the filter to a wide variety of internationally available bottles. The water is treated as it is drawn from the bottle through the filter.

Historically filters have been made of granular materials, and the ability to adapt filters for a variety of purposes to the same bottle with a universal adaptive closure and valve did not exist. Nor did small portable personal filters which could virtually eliminate micro-organisms such as protozoa, bacteria, and viruses at an affordable cost. The combined filters and bottle closures described, which mount the filters and support the valving device, provide such benefit. Both granular and porous plastic matrices (such as available from Porex Corporation, Atlanta, Ga.) may be used.

According to the invention, a multi-purpose convertible cap, or closure, for a sport bottle with a neck opening of 35 mm through 65 mm, but not limited to such size, is provided. Normally, such a bottle utilizes a screw on cap, but the cap may also be modified to be a snap on type, using a sealing lip which snaps over the mating surface of a bottle designed to accommodate such a snap on cap. The purpose of such a cap is to utilize and adapt one or more exit type radial flow water filters to provide a higher level of performance vs., typically, on the end of a straw at the bottom of the bottle. The subject cap permits exit filters to be engaged by a ring molded to the inside of the cap and sized to mate with either a filter or a filter containing housing from nominally 18 mm in diameter through 63 mm in diameter, but not limiting the design to a specific diameter as the subject invention also has use in multi-gallon containers with large top openings or open tops.

For use in conjunction with the cap, or closure, a series of interchangeable water filters may be provided. These filters are highly efficient, small relative to their high performance, and designed for a variety of requirements from taste, odor, and chlorine removal to the removal of both chemical and heavy metals contamination, through handling most pathogenic biological contamination problems.

According to one aspect of the present invention a filter assembly for use with a bottle having a circular cross-section neck or open end is provided which comprises the following components: An outer housing generally tubular in configuration and having openings or pores therein to allow the radial flow of liquid therethrough. A fine filtration media disposed radially inwardly of the outer housing, the fine filtration media having a pore size of between about 1–3 microns, e.g. capable of removing contaminants of 3 micron and larger. An inner filtration media disposed radially inwardly of the fine filtration media, the inner filtration media including but not limited to activated carbon. The outer housing dimensioned to pass through the neck or open end of a bottle. And, the outer housing, fine filtration media, and inner filtration media, being positionable in a bottle and with respect to each other so that liquid must pass through the outer housing, then the fine filtration media, and then the inner filtration media, before passing through the neck or open end of a bottle.

The fine filtration media may comprise at least a first support filter element mounting a high efficiency particulate filter having at least 99% removal efficiency for particles between 3–4 microns and larger (such as protozoa). Preferably the high efficiency particle filter passes the turbidity reduction test based on NFS 53-1994, Section 6.5.2, and the filter assembly has a pressure drop of less than about 3 psi. The high efficiency particulate filter preferably comprises a microfiber filter media formed of glass microfibers having varying cross-sectional diameters and having a porosity of about 1–3 microns (e.g. 1–2 microns). The first support filter element preferably comprises a supporting filter sheet adhered to the microfiber filter media either adhesively, mechanically, or in any other suitable manner, and the support filter sheet preferably comprises first and second filter sheets sandwiching the inorganic microfiber filter media between them and adhered to each (e.g. adhesively or mechanically), and the first and second filter sheets preferably each have a porosity of about 3–10 microns, although porosity is not critical for the supporting sheets and can be considerably more. The first support filter sheet (and second support filter sheet if provided) and adhered inorganic microfiber filter media may have a pleated or accordion configuration for enhanced surface area, and mechanically bonding the three filter sheets.

The inner filtration media may comprise a porous activated carbon, plastic matrix having a porosity of between about 10–150 microns. The inner filtration media is preferably tubular, and connected to a cap having a manual valve (as described in said U.S. Pat. No. 5,609,759).

According to another aspect of the present invention a filter assembly for use with a bottle having a circular cross-section neck or open end is provided comprising the following components: A radial flow block filter element having a porosity of between about 10–150 microns and having a central bore with a bottom. A drinking straw disposed within the central bore above the bottom. A spring disposed in the bore and acting between the bottom and the straw to bias the straw towards a position in which a sufficient length of straw is above the radial flow block filter element to allow a human to readily withdraw liquid through the straw from the bore. And, the filter element dimensioned to fit through a bottle circular neck or open end.

The assembly as described above may further comprise a generally tubular plastic housing surrounding the filter element, the housing having an outer surface, a plurality of ribs, and an inner surface, the plurality of ribs having slots formed between them. When formed in the axial plane the majority of the ribs may each have an outer surface at least 50% larger than the inner surface. The ribs are typically tapered from the outer surface to the inner surface so that they have a substantially triangular cross-section, with the outer surface forming the triangle base and the inner surface the apex. The apex may be truncated where desired so that the substantially triangular cross-section is actually technically trapezoidal. The filter has an outer surface area, and the ribs and slots are preferably dimensioned so that at the area of the slots and the filter element so that at least about 75% of the outer surface area of the filter area can be contacted by liquid flowing through the slots.

The filtration assembly may be in combination with a bottle having a circular neck or open end, and a dimension of elongation. In this case the filter element is dimensioned to fit through the circular neck or open end, and is positioned within the bottle so that the bore is substantially parallel to the bottle dimension of elongation. A cap may cooperate with the bottle neck or open end, for engaging the straw and, in a closing position, holding the straw against the spring bias in the bore.

According to yet another aspect of the present invention a filter assembly for use with a bottle having a circular cross-section neck or open end is provided comprising: A liquid filter element having a generally cylindrical configuration and dimensioned to fit into a bottle through a circular neck or open end thereof; and a generally tubular plastic housing surrounding the filter element, the housing having an outer surface, a plurality of ribs, and an inner surface, the plurality of ribs having slots formed therebetween; and wherein the majority of the ribs each have an outer surface surface area at least 50% larger than the inner surface surface area. The ribs are preferably tapered from the outer surface to the inner surface so that they have a substantially triangular cross-section, with the outer surface forming the triangle base and the inner surface the apex, as described above.

According to yet another aspect of the present invention a filter assembly for use with a bottle having a circular cross-section neck or open end is provided comprising the following components: A filter element comprising a porous rigid matrix of at least 25%–50% (e.g. at least about 35%) activated carbon by weight; the remainder being made up of styrene, and metal removing polymer bound to the styrene, the filter element having a porosity of between about 10–100 microns, while possible to use other materials to secure the carbon and to use as a substrate to bond the metal removing polymers, stryrene provides the simplest, high loading substrate. The filter element is dimensioned to fit in a bottle through the circular neck or open end thereof.

According to yet another aspect of the present invention a filter assembly for use with a bottle having a circular cross-section neck or open end is provided comprising the following components: A cap for closing the circular neck or open end of a bottle, the cap having a top of a first area. A filter element housing extending upwardly from and operatively connected to the cap top and having a maximum cross sectional area at least 20% larger than the cap top area. A liquid filter element mounted within the housing. A manual valve operable to be moved between an open position in which liquid may flow therethrough and a closed position in which liquid may not flow therethrough, the manual valve operatively connected to the filter element. And, the valve, cap, housing and filter element positioned with respect to each other so that liquid flowing through the cap must pass through the housing, filter element, and valve before being dispensed.

The housing may be substantially spherical, and the filter element may comprise two mating hemispherical sections disposed within the housing. The housing may have a top and a bottom opposite the top, and the valve may be mounted to the top of the housing and the cap mounted to the bottom of the housing. Alternatively the housing may be substantially disc-shaped, or substantially bulging disc-shaped, in configuration. Regardless of the shape of the housing it may have an exterior configuration or decoration attractive to a human child, such as a face, human head characteristics, animal head characteristics, game ball characteristics, etc.

The invention also relates to a bottle cap which can accommodate and mount two (or more) different types of filters. That is the invention also contemplates bottle cap and filter assembly comprising the following components: A bottle cap having a top surface and a bottom surface mounting a substantially annular support ring, and a through extending opening, through which liquid may flow between the top and bottom surfaces, the ring surrounding and substantially concentric with the opening. The support ring having inner and outer portions of different diameter. A first filter element for filtering liquid passing therethrough, and having an outer surface which can cooperate with the inner portion of the support ring so that the first filter element is held in operative association with the support ring and filters liquid passing therethrough before the liquid passes through the opening; and a second filter element for filtering liquid passing therethrough, and having an inner surface which can cooperate with the outer portion of the support ring so that the second filter element is held in operative association with the support ring and filters liquid passing therethrough before the liquid passes through the opening. The assembly may further comprise inner and outer retention rings formed on the inner and outer portions, respectively, of the substantially annular support ring. The first filter element has a depression in the outer surface thereof cooperable with the inner retention ring, and the second filter element has a depression in the inner surface thereof cooperable with the outer retention ring.

It is the primary object of the present invention to provide simple, yet effective and versatile, filtration assemblies, typically in combination with drinking water bottles. This and other objects of the invention will become clear from an inspection of the detailed description of the invention and from the appended claims.

BRIEF DESCRIPTION OF THE DRAWINGS

FIG. 4a is a side view, partly in cross-section and partly in elevation, of a conventional threaded closure for a bottle open end with a filter assembly according to the present invention showing filter housings for mounting to the internal as well as external surfaces of the mounting boss accommodating filters of different diameters;

FIG. 4b is a side view of an alternative configuration of the cap, with a manual valve, utilizable with various filter assemblies and in place of the cap as illustrated in FIG. 4a;

FIG. 5 is a side view, primarily in cross-section but partly in elevation, of another form of filter assembly, including a cap and manual valve, according to the invention;

FIGS. 8 through 10 are views like those of FIG. 7 of other modifications according to the present invention;

FIG. 13 is a side cross-sectional view of an exemplary filter plug per se which may be used in various open cage housing constructions according to the invention;

FIG. 14 is a side view of a housing that may be used with the filter plug of FIG. 13;

FIG. 15 is a bottom view of the housing of FIG. 14;

FIG. 16 is a side cross-sectional view of another form of filter assembly according to the invention, while

FIG. 19 is a top plan view of the assembly of FIG. 18;

FIG. 20 is another configuration similar to that of FIG. 18 only with a different filter in the interior thereof;

FIG. 22 is a view like that of FIG. 16 for another form of filter assembly according to the invention;

DETAILED DESCRIPTION OF THE DRAWINGS

Figure 1:
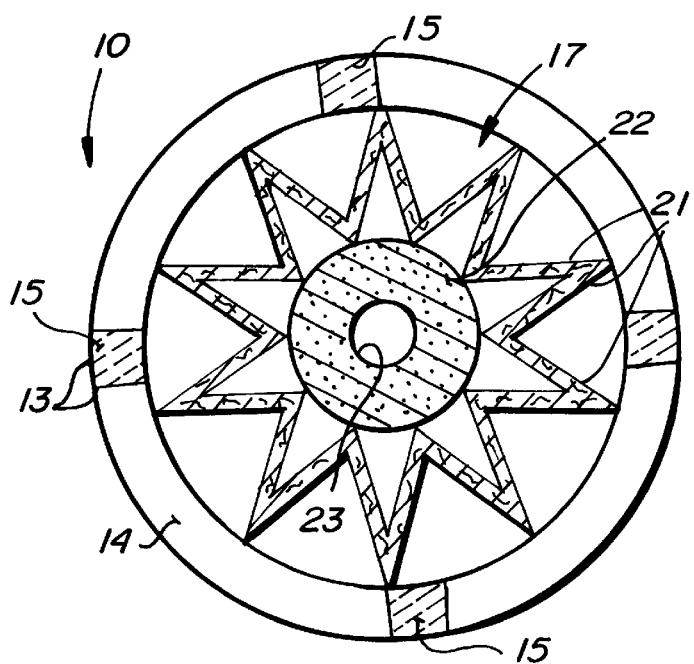
FIG. 1 is a longitudinal cross-sectional view of an exemplary filter assembly according to the invention for use in filtering out protozoa or like biological materials, and to be provided in association with a bottle.
Figure 3:
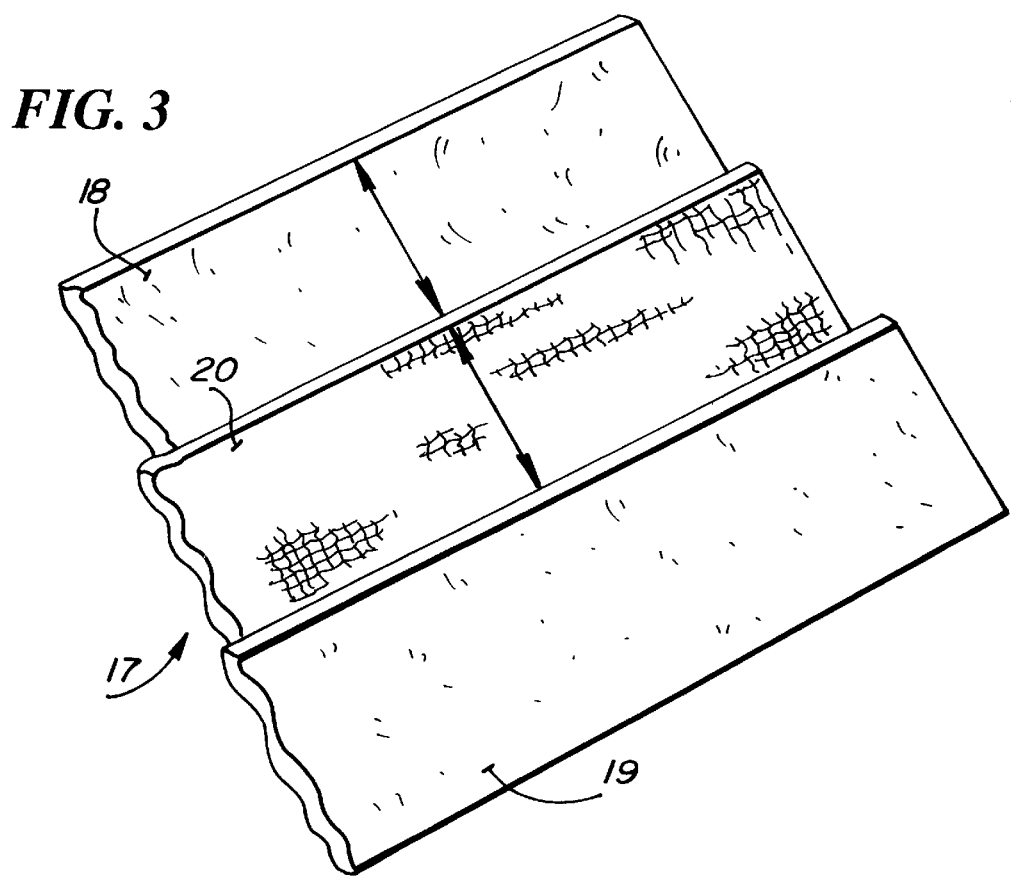
FIG. 3 is a top partial perspective exploded view showing one exemplary configuration of the fine filtration media used in the filter assembly of FIG. 1.
Figure 2:
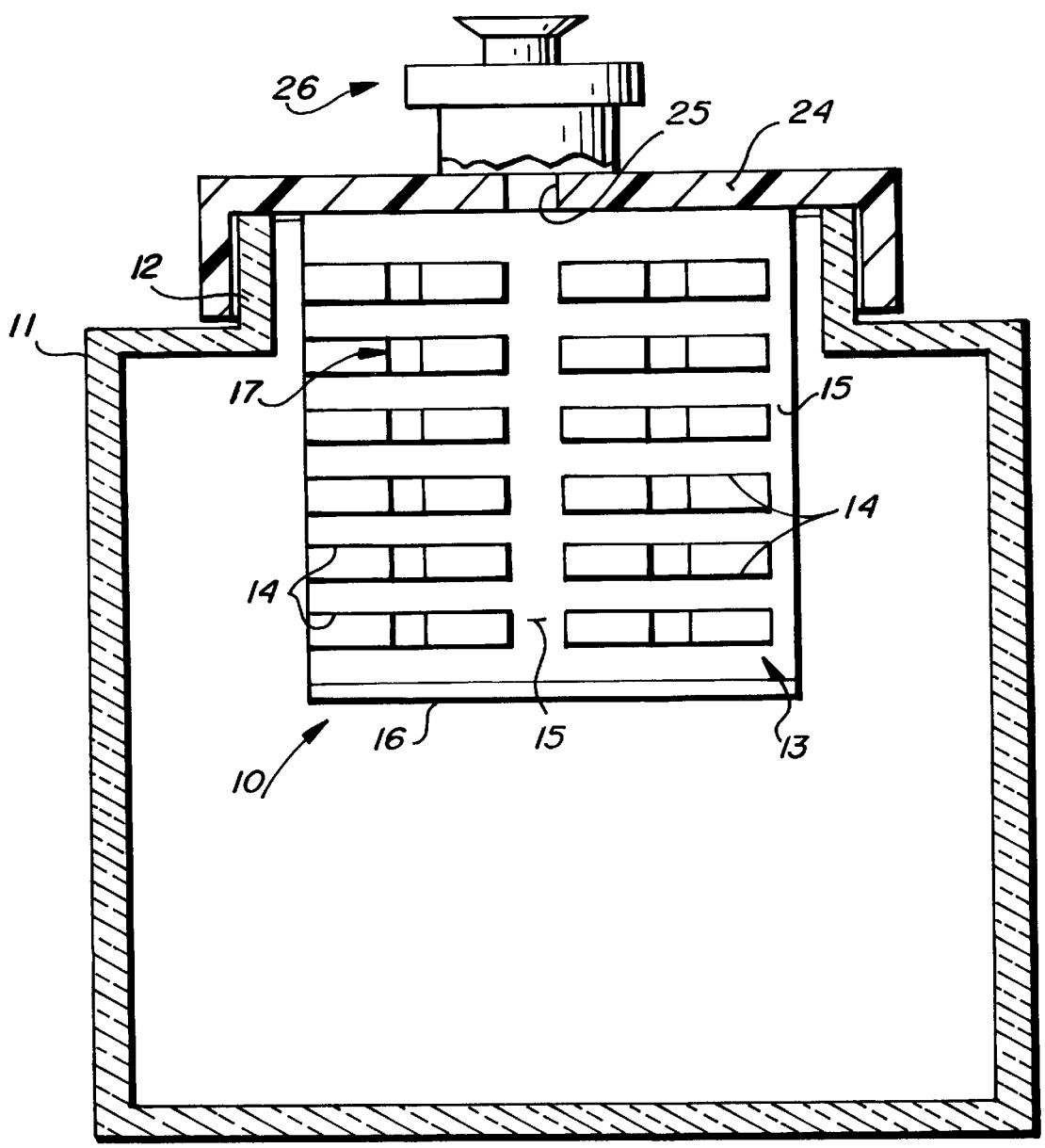
FIG. 2 is a side view, with the bottle and cap shown in cross-section and the filter and valve in elevation, of the filter assembly of FIG. 1 in use in a bottle.

FIGS. 1 through 3 show a first embodiment of a filter assembly according to the present invention, shown generally by reference numeral 10, for use in a conventional bottle 11 (e.g. a plastic squeeze or sport bottle), having a circular cross-section neck or open end 12. The filter assembly 10 includes an outer housing 13 that is generally tubular in configuration, and has openings or pores 14 therein to allow the radial flow of liquid therethrough. In the embodiment illustrated in FIGS. 1 and 2 the openings 14 are generally horizontal slots (when the bottle 11 is upright) formed between supporting ribs 15, but may be holes or other shaped openings. The bottom 16 is typically closed.

The assembly 10 further comprises a fine filtration media 17 disposed radially inwardly of the outer housing 13. The fine filtration media 17 preferably has a pore size of between about 1–3 microns, so that it is capable of removing protozoa or other biological contaminant so that the filter assembly 10 can be used even without tap water (e.g. used with water in lakes and streams which may typically have protozoa cyst contaminants therein.

The fine filtration media 17, in the preferred embodiment thereof, preferably comprises at least a first support filter element 18 mounting a high efficiency particle filter 20 having at least 99% removal efficiency for particles between 3–4 microns and larger. Preferably a second support filter element 19 is also provided with the high efficiency particulate filter 20 sandwiched between the support filter elements 18, 19.

The high efficiency particulate filter 20 preferably passes the turbidity reduction test based on NSF 53-1994, Section 6.5.2, and the entire filter assembly 10 has an initial pressure drop of less than about 3 psi. In one embodiment that is preferred the high efficiency particulate filter 20 comprises a microfiber filter media formed of glass microfibers of varying cross-sectional diameters having a median porosity of 2–3 micron to contain greater than 99% of biological elements of 3–4 micron size or greater. The porosity may be even lower (e.g. about 1–2 microns). One preferred material that is commercially available that may be used for this construction is Lydall 9390 inorganic filtration media.

Also in the preferred embodiment the support elements 18, 19 comprise polyester filter sheets, e.g. each of the elements 18, 19 preferably having a porosity of at least 3–10 microns and a weight of at least ½ ounce per square yard. The support elements 18–19 are provided because the high efficiency particulate filter 20 may not have enough rigidity to stand on its own in the desired configurations, and also to retain any loose glass fiber particles.

The support filter elements 18, 19 are preferably adhered to the microfiber filter media 20, such as by spots of adhesive, or by some sort of a mechanical connection, which may include stitching, deformation of the elements, staples, intertwining, or a wide variety of other mechanical connections. In fact virtually any connection that holds the elements 18 through 20 together while still allowing them to function as a fine filter without the chance of "leakage" of unfiltered liquid therethrough, is appropriate.

While the fine filtration media 17 may be disposed in a wide variety of configurations, in order to provide a large surface area while still effectively functioning as a filtration media, and for minimizing the amount of space necessary in the other housing 13, the media 17 preferably has a pleated or accordion configuration such as illustrated at 21 in FIG. 1. Other configurations might include a sine wave type configuration, concentric tubes, or a variety of other configurations including flat.

The filter assembly 10 further preferably comprises an inner filtration media 22 disposed radially inwardly of the fine filtration media 17, the inner filtration media 22 including activated carbon. For example the inner filtration media 22 may comprise a porous activated carbon, plastic matrix having a hollow interior 23, and a porosity of between about 10–150 microns. The amount of activated carbon can be varied as described in said U.S. Pat. No. 5,609,759, and which media is available commercially, such as from Porex Corporation of Atlanta, Ga.

The housing 13 and/or the inner filtration media 22, or both, may be connected to a cap 24 having an opening 25 therein communicating with the interior opening 23 of the inner filtration media 22, the cap also having a manual valve 26 thereon. As seen in FIG. 2 the cap 24 may be screw threaded on, have a snap fit with, or otherwise be connected to the neck 12 of the bottle 11. In FIG. 2 the manual valve 26 is shown as a conventional push-pull valve such as on a conventional squeezable bike bottle, but any suitable conventional manual valve for containers may be utilized, such as a tube that is pivoted to the closed position, a nipple, relatively rotatable elements, or the like.

As readily seen in FIG. 2, the housing 13 of the filter assembly 10 is dimensioned to pass through the neck or open end 12 of the bottle 11. When the filter assembly 10 is positioned in the bottle 11 as illustrated in FIG. 2, the outer housing 13, fine filtration media 17, and inner filtration media 22 are positionable in the bottle 11 and with respect to each other so that liquid must pass through the outer housing 13 openings 14, then through the fine filtration media 17, and then through the inner filtration media 22, before passing through the neck or open end of the bottle 11.

FIG. 4a shows a filter assembly and cap combination according to the invention that may be utilized with a conventional bottle having a screw threaded neck. In the embodiment of FIG. 4a two different types of filters 28, 29 are provided one concentric with the other, such as two different types of porous activated carbon, plastic, or like matrices. The inner filter element 29 may have an annular depression which is designed to cooperate with an inner retention ring 31 formed on a depending substantially annular retaining support ring 32 attached to a bottle cap 33. All of the elements 31–33 may be molded with suitable plastic. The cap 33 may have internal screw threading 34 for cooperation with external screw threads of a conventional bottle. Alternatively, or in addition, the support ring 32 may have an outer retention ring 35 which is adapted to cooperate with another ring 36 formed in a depression 37 in the outer filter element 28. With one or both of the rings 32, 35 snapping into place in the depression 30 or past the ring 36, the filters 28, 29 are releasably connected to the cap 33. The filters 28, 29 are preferably not connected to each other, but shown as two separate individual filters either of which may be moved into contact and retained by the retaining rings 31, 35.

Connected to the top surface of the cap 33 may be an externally screw threaded (as indicated by screw threads 38) opening 39 which can be closed by an internally screw threaded (the internal screw threads being shown by reference numeral 40) outer cap 41, so that when the cap 41 is unscrewed and the bottle with which the cap 33 is associated inverted, liquid will be filtered as it moves through the filters 28, 29 through the opening 39 to be dispensed. The substantially annular ring 32 surrounds the opening 39 and is preferably substantially concentric therewith.

As shown in FIG. 4b (where like components to the FIG. 4a embodiment are shown by like reference numerals) instead of the opening 39 enclosed by the cap 41, a conventional push-pull bike valve 42 may be provided on the cap 33.

FIG. 5 shows a modification of the filter/cap/valve assembly of FIG. 4b. In the FIG. 5 embodiment an outer plastic housing with a plurality of openings therein, 43, is provided surrounding a filter element 44, such as a porous activated carbon, plastic matrix having a porosity of between about 10–150 microns, with an open interior 45 communicating through opening 46 passing through a cap 47. The cap has an annular depression 48, which is received by a retaining ring formed in the upper portion 49 of the housing 43, similar to the retaining rings 31, 35, to hold the housing 43 and filter element 44 in place in the cap 47. A manual valve 50 (e.g. a conventional push-pull valve) extends outwardly from the cap 47.

Figure 6:
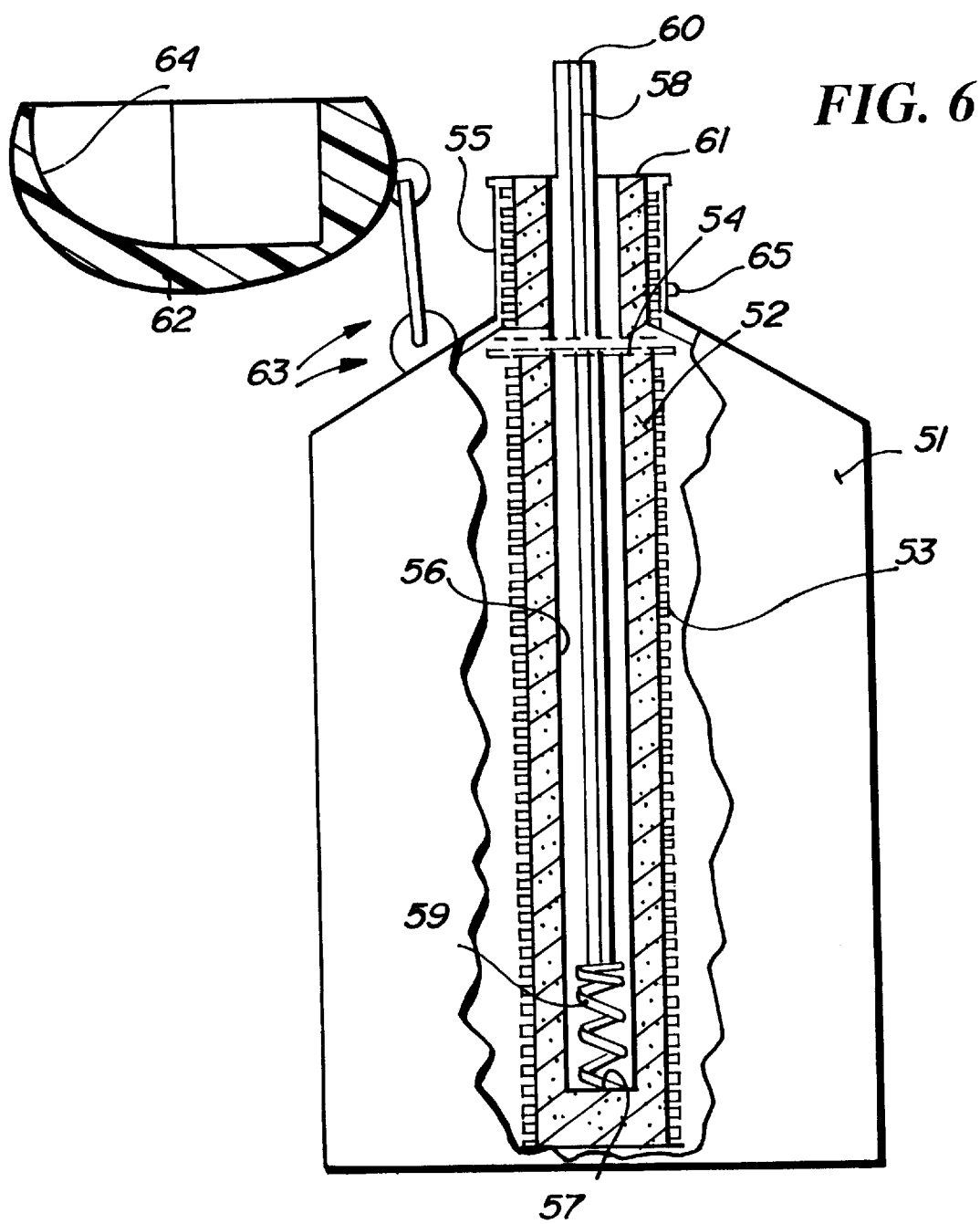
FIG. 6 is a side view, partly in elevation, partly cut away, partly in cross-section, of a bottle and valve assembly with a straw according to the present invention.
Figure 7:
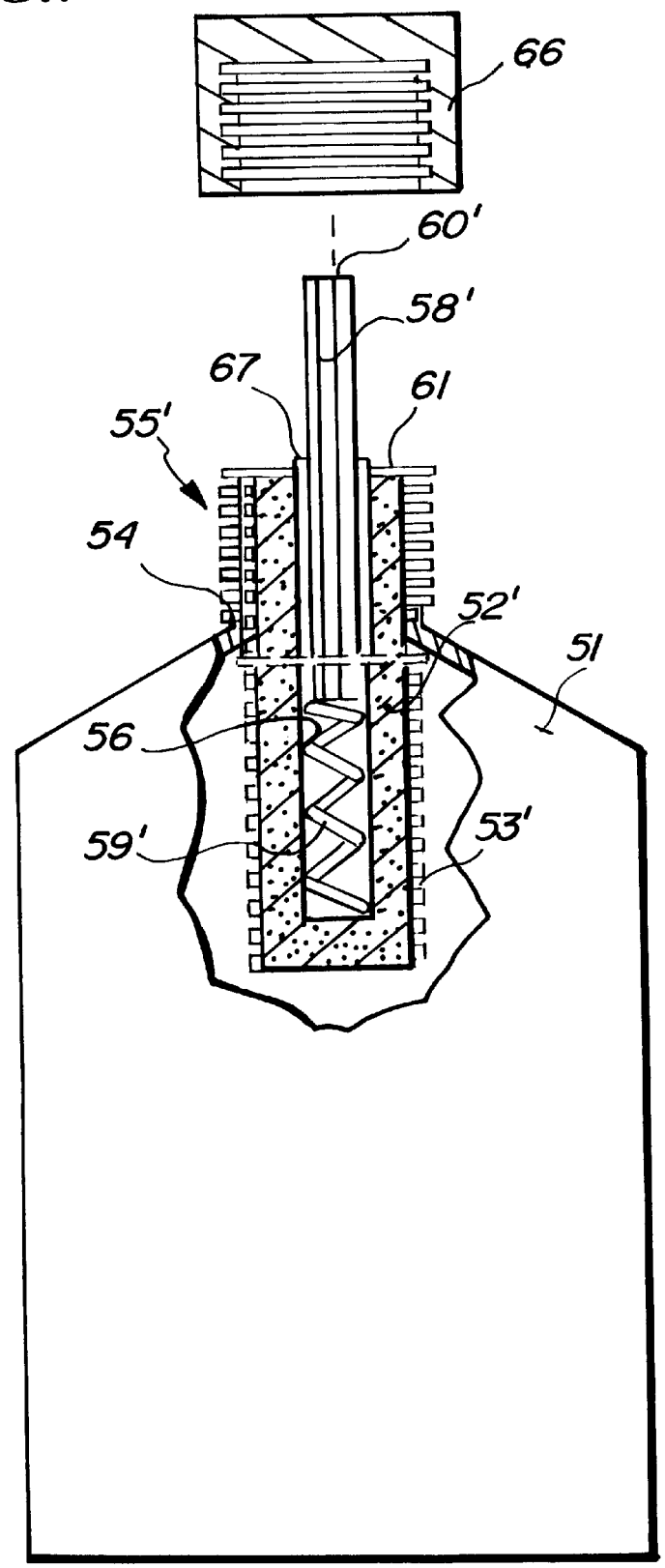
FIG. 7 is a view like that of FIG. 6 for a modified form of bottle combined with closure and straw according to the invention.

FIGS. 6 through 8 illustrate embodiments that are specifically designed to be used by older people or others that do not like drinking through a "push-pull" valve cap, or from an inverted bottle.

In the embodiment of FIG. 6, the bottle 51 contains a flange mounted filter 52, e.g. a porous activated carbon, plastic matrix having a porosity of between about 10–150 microns (and preferably containing about 40–80% carbon by volume), surrounded by a plastic housing 53 with a plurality of openings therein. The housing 53 contains a female groove (not shown) into which an elastomeric ring 54 is placed that provides a seal to the side wall or neck 55 of the bottle 51 which also retains the filter 52 in place within the bottle by slight friction, while allowing the filter 52 and housing 53 to be easily removed from the bottle 51. In the preferred embodiment the elastomeric ring 54 is mounted so that the bottom of the filter element 52 is slightly above the bottom of the bottle 51.

The radial flow block filter element 52 has a central bore 56 with a bottom 57. A drinking straw (typically of plastic) 58 is disposed within the central bore 56 above the bottom 57, and a spring 59 is disposed in the bore 56. The spring 59 may have a wide variety of constructions but in the configuration illustrated in FIG. 6 comprises a coil spring 59. Preferably the spring 59 is of a material that will not corrode, such as stainless steel or plastic, and has sufficient compressibility so that the straw 58 can be pressed downwardly into the filter 52 so that the open top 60 of the straw 58 is even with the top 61 of the filter 52 and/or bottle 51 without the straw 58 being deformed, and the spring 59 will allow liquid to flow into the open bottom of the straw 58. Note that the straw 58 has a relatively loose fit in the bore 56 to allow water to flow between the inner surface of the bore 56 and the straw 58 to the open bottom of the straw 58.

Also mounted on the bottle 51 is a closure cap 62. A hinge and boss closure 63 mounts the cap 62 so that it can be pivoted from the open position illustrated in FIG. 6 to a closed position in which an interior cam element of the cap 62, namely the surface 64, depresses the open top 60 of the straw 58 against the bias of the spring 59 so that the straw 58 top 60 moves into a position substantially flush with the top 61 of the filter 62 and/or bottle 51. The cap 62 may be retained in place once pivoted to close the open top of the bottle 51 by a friction lock 65, or any other conventional suitable locking device. Thus when using this structure, when the cap 62 is opened the straw 58 springs into the position illustrated in FIG. 6, and when the cap 62 is closed the straw 58 is depressed.

FIG. 7 illustrates an embodiment similar to that in FIG. 8, with identical components being shown by the same reference numeral and with very similar components being shown by the same reference numeral only followed by a "'".

In the FIG. 7 embodiment, the filter block 52' and the housing 53' are not as long as in the FIG. 6 embodiment. The neck 55' has external screw threads which cooperate with the internally screw threaded cap 66 to depress the straw 58' against the bias of the spring 59'. When the cap 66 is screwed into place the straw 58' open top 60 is flush with the top 61 of the bottle 51 and/or filter block 52', whereas when the cap 66 is removed the straw 58' is biased to the position illustrated in FIG. 7 so that water may be sucked therethrough, passing through the filter block 52' for the removal of chlorine therefrom.

Also the embodiment illustrated in FIG. 7, the space between the straw 58' and the internal bore 56' of the filter block 52' is relatively small, and the straw 58' and the spring 59' can be removed so that if the bottle 51 is a squeeze bottle, it may be distorted to cause the liquid to flow therethrough much like in the configurations in the U.S. Pat. No. 5,609,759, or in filter bottles utilized with the constructions in FIGS. 2, 4a, 4b, and 5. Also in this embodiment a water seal 67 may be provided between the exterior of the straw 58' and the filter block 52' so that the bottle 51 may be used in an inverted position as well as the upright position illustrated in FIG. 7.

In the embodiment illustrated in FIG. 8, the bottle 51 has mounted therein a radial flow block filter element 68 like the element 52, 52' except that the straw 69 is substantially permanently mounted to the block 68, for example making a friction fit with the interior passage 70 and the block 68 and/or making a friction fit or integral with the cap 71 which fits over the neck 55' of the bottle 51. The interior cavity 70 may have a conical end portion 72, and an optional dust cover 73 may be used to cover the open top of the straw 69 when not in use. An elastomeric sealing ring 74 mounted to the interior of the block 68 may also be provided to facilitate the substantially permanent connection of the straw 69 to the block 68. The block 68 and straw 69 combination are then replaced as necessary.

FIG. 9 shows a configuration in which an activated carbon or catalytic radial flow filter element 75, typically having a hollow interior 76, is mounted by a soft elastomeric ring 77 or the like to the neck 55' of the bottle 51. The filter 75 may be an independent monolithic block, or a filter media contained within an outer housing that is porous. Any of a variety of media including activated carbon/polymer matrix may be utilized. The filter 75 may be used in the same manner such as described above with respect to the FIGS. 1 through 5 embodiments and as in the U.S. Pat. No. 5,609,759, or it can be used with commercially filled bottles of water containing an anti-bacterial agent such as chlorine or iodine. Maintaining sterile bottles of water becomes less of a problem with chlorine added to the water for disinfection prior to being sealed within the bottle. The filter 75 is then inserted at the top of the bottle closure before sealing, and the filter 75 is in direct contact with the water within the container 51. As a result of the diffusion and equilibrium phenomena, the chlorine contained within the water is gradually absorbed by the filter 75 within one to four days (e.g. three to four days). Chlorine which is not absorbed, as a result of diffusion, and which remains in the water is removed as the water is poured out through the filter 75. The filter 75 is designed to offer minimal resistance to the passage of the water yet remains effective for filtration allowing the bottle to be refilled as many as forty to seventy times. A porosity of the structure 75 that is between 20–150 microns is usually suitable. If there is no desire to use the filter as an exit filter with tap water refills, a more open porosity may be employed including contained, but unbonded particles, of as much as a ten sieve size.

The filter 75 may—in the embodiment illustrated in FIG. 9—be used with a manual valve such as a conventional nursing nipple 78 which has a flange 79 at the bottom thereof that seals with the top 61 of the filter 75/bottle 51. The nipple 78 is held in sealed condition, the flange 79 thereof being compressed, by the internally screw threaded cap 80 which has an opening 81 therein through which the nipple 78 extends. A top flange may be provided integral with the filter 75 for holding the filter 75 on the top of the bottle 51 (that is the structure 61 may be a top flange), with the cap 80 also holding it in place when screwed into contact with the bottle 51.

FIG. 10 illustrates an embodiment which is similar to that of FIG. 9 except that the filter 82 has a porosity of about 80 microns or less. An impermeable membrane 83 covers the filter 82 supported by the flange 84 on the top of the bottle 51 (on the top of the neck 55'). The purpose of the membrane 83 is to separate the filter from the water within the bottle 51 should it prove desirable to retain the disinfectant within the bottle 51 for an extended time period. At the time of use, the impermeable membrane 83 is removed by the consumer from the filter 82 by unscrewing the cap 85, removing the filter 82 and membrane 83, and then stripping the membrane 83 off the filter 82 and reinserting the filter 82. The filter 82 then filters the water upon exit from the container 51. The cap 85 may be of the type closed by a snap top 86 which can be pivoted down to close the opening 87 therein.

Figure 11:
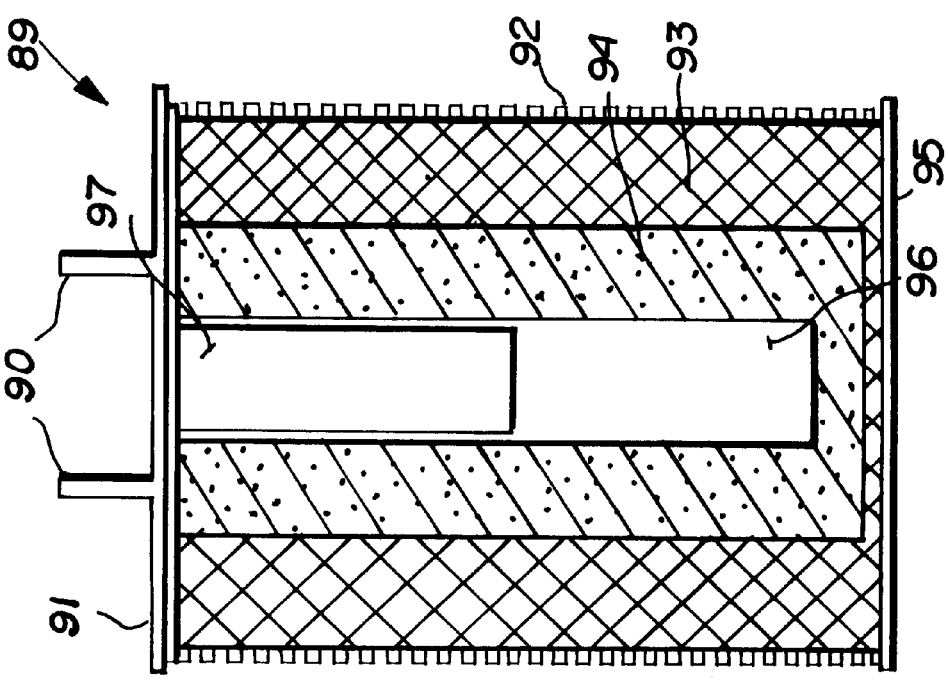
FIG. 11 is a cross-sectional view of an exemplary multi-media filter designed for flange mounting on the neck of a large (typically 53 mm–63 mm) neck bottle.

FIG. 11 shows a multi-media filter 89 which is an alternative to that described in FIGS. 1–3 designed for flange mounting upon the neck of a typical 53 mm to 63 mm neck bottle; however, the design is not size or diameter limited. This filter 89 may also be adapted for mounting to a cap as shown and described with respect to FIGS. 4a–5, for example by using the receptacle 90.

The filter of FIG. 11 preferably contains a mounting flange 91, as an alternative to mounting receptacle 90. The assembly is supported by an open outer cage 92 through which the water to be treated flows radially, first through an inorganic fiber mesh filter 93, which eliminates microorganisms larger than 3–6 microns. To increase the surface area of the inorganic fiber filter 93, it is of pleated construction, neck space permitting, for insertion to a container. Passing through the fiber microfilter 93 the radially flowing water contacts and passes through a monolithic carbon annulus 94 with the bottom end 95 of both the carbon and fiber elements sealed across the top and base 95. Normally a potting agent is used to effect such seal 95 precluding the passage of untreated water. The monolithic annulus 93, while most generally formed of carbon and polyethylene binder can incorporate or be made of ion-exchange resins, or zeolyte compounds, which in turn may be iodinated for biocidal purposes. The central open core 96 formed inside the annulus may be left open, or used to contain a third filter element 97, which could range from granular activated carbon to catalytic materials, biocidal materials, or other alternative filtration media, and for medias such as flavoring agents, vitamins and minerals. All, or only part of, the central area 96 can be so used.

Figure 12:
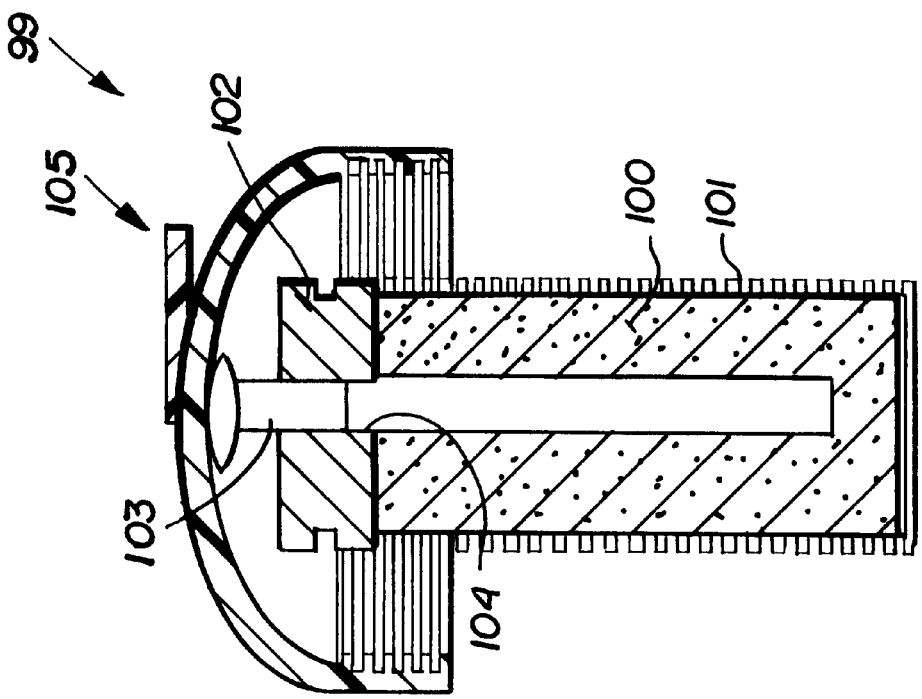
FIG. 12 is a side cross-sectional view of another form of filter assembly/cap according to the present invention.

FIG. 12 illustrates an assembly 99 that incorporates a filter 100 with housing 101, 102 that may be adapted to fit onto the small inner boss 103 extension. The housing 102 has been designed to serve several purposes, extending down from the top, as represented by FIG. 12, or to adapt to a flip valve which opens in the vertical plane or a small standard 28 mm push-pull top. The filter housing 102 mount is also designed so as to also be used to mount a plastic straw which in turn enters the filter housing 102 through the access hole 104 and is engaged by the reduced base of the housing 102 at the bottom thereof. In this instance water is drawn through a conventional lay down sipper valve 105 as shown with a straw extending between inner boss extension 103 and the filter engaging access opening 104. The filter 100 itself preferably is the same as previously described.

FIGS. 13 through 15 illustrate another exemplary filter assembly, shown generally by reference numeral 110, according to the invention. The filter element 110 has a generally cylindrical configuration and is dimensioned to fit into a bottle, such as the bottles 51 in earlier figures, through a circular neck or open end thereof. A generally tubular plastic housing 111 surrounds the filter element 112. The filter element 112 may be a monolithic carbon filter with polyethylene binding, such as described above in the earlier figures. The housing 111 is similar to the conventional housings for such filters except that the openings therein are oriented generally vertically during normal use of the assembly 110, and because of the particular nature of the construction of the opening-forming elements thereof.

The assembly 110 includes a plurality of ribs 113, each of the ribs having an outer surface 114 and an inner surface 115. Slots 116 (see FIGS. 14 and 15) are formed between and by the ribs 113, and as seen in FIG. 15 the majority of the ribs 113 (preferably substantially all, or all, of the ribs 113) have an outer surface 114 with a surface area at least 50% larger than the inner surface 115 surface area. In the embodiment illustrated in FIG. 15 the way that this is accomplished is to provide the ribs 113 so that they are tapered from the outer surface 114 to the inner surface 115 so that they have a substantially triangular cross-section, with the outer surface 114 forming the triangle base and the inner surface 115 the apex. Of course the inner surface 115 apex may be truncated, in which case the substantially triangular cross-section of the ribs 113 is technically a trapezoid.

When the ribs 113 are constructed as described above, the outer surface area of the filter element 112 can be contacted by the maximum amount of liquid flowing through the slots 16, not being precluded by engagement with the surface 115. Preferably the amount of surface area of the outer periphery of the filter element 112 that can be contacted utilizing the construction illustrated in FIGS. 13 through 15 is at least about 75%, and up to about 80%. A base 118 is preferably provided connected to the ribs 113 to provide sufficient rigidity for the ribs 113 so that the entire assembly 110 has sufficient structural integrity. The base 118, instead of merely contacting the surfaces 115, may cover the entire bottoms of the ribs 113 so that the triangular cross-sectional area thereof as illustrated in FIG. 15 would not be visible from the bottom view shown there.

FIG. 16 illustrates a monolithic filter block 120, made of activated carbon granules, and/or other filtration media bonded together into the shape of a single closed end annulus with a porosity of 10–200 microns, containing 40% to 80% carbon by volume, and capable of removing at least 70% of the chlorine present at a flow rate of 3 ml/sec. The filter is designed to operate with a radial flow of water through the side walls into the open center 121. The monolithic annulus block 120 is covered on its the circumference, and optionally its bottom, by a microbiological filter 122 consisting of or comprising inorganic fibers and a microporous substrate capable of removing cysts and turbidity by 99% or more. This combination of components permits flow across the microporous biological filter with a minimal pressure drop suitable to delivering water through the filter by "sucking" or pressurizing a mating pliable plastic container by squeezing with normal non-exertive hand pressure. Typically, less than ½ psi pressure drop will be developed to transfer water across the filter/media wall. Tests have shown that nine inches of atmosphere is sufficient, and thirty-six inches of atmosphere which translates to about 3 psi, may be attained by either hand pressurizing or sucking from a squeeze type bottle permitting a further reduction of porosity, if desired or necessary for the intended purpose. By combining both methods of creating pressure additional force may be generated. Thus, the pressure required to achieve the desired flow rate is well under the practical maximum. The design may also be altered to be used with an auxiliary pump or pressurizing device permitting reductions of porosity into the sub-micron range, i.e. under one micron.

The embodiment of FIG. 16 is useful in those situations where it is necessary to reduce the diameter of the assembly 123, the embodiment of FIG. 16 eliminating the need for an outer plastic cage, presenting a clean attractive exterior appearance at installation. A change of color, through use of the filter 122, provides a visual indicator relative to change. The micro-porous biological filter 122, and monolithic carbon annulus 120, are preferably bonded together top and bottom with potting compound 124, or an appropriate adhesive compound. The bonding compound 124 is also used to affix the top filter housing 125 to the filter elements 120, 122. The top 125 may be sized to fit within a 28 mm bottle neck in which instance the major diameter of the entire filter would be of the same diameter as mounting boss 126. As shown the top filter housing mounts to a 53 mm top, as in FIGS. 4a and 4b, and mounting to the extended cylindrical boss 32 therein, as seen in FIGS. 4a and 4b.

Figure 17:
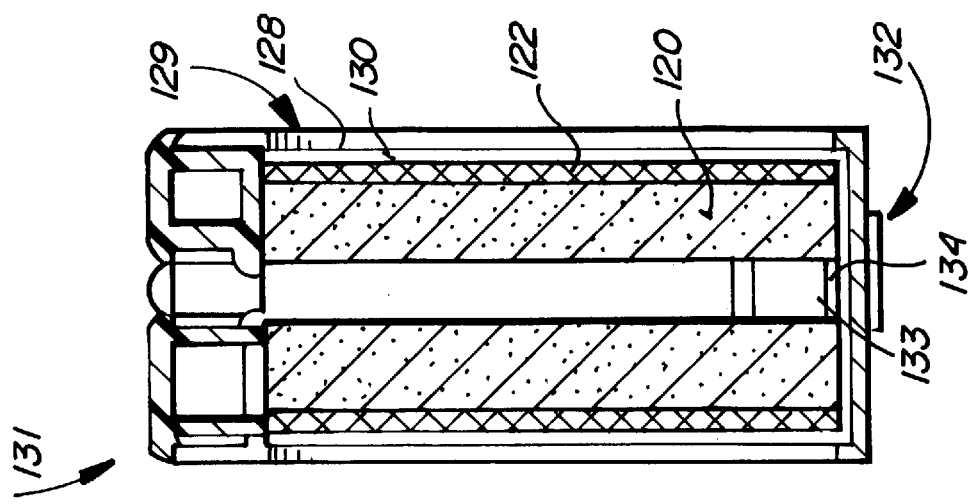
FIG. 17 is a view like that of FIG. 16 only showing an outer housing contained around the filter element.

FIG. 17 shows a filter as described for FIG. 16 but contained in an outer housing 128 open for water intake only at the base 129, permitting radial flow. The housing and filter elements 120, 122 are separated by the open annulus 130 of about 1/16" cross section. This open annulus 130 provides a path for water to access the entire face of the filter, yet maximizes the removal of water without air intrusion. To permit the rapid return of air to fill any vacuum created as a result of the exiting water, and partial collapse of the pliable container in which the assembly 131 is mounted, a normally closed relief valve 132, is incorporated. The path of least resistance for air to flow back through the filter is through the base of the filter directly above the normally closed relief valve 132. Within the filter base above the valve 132, biocidal resin 133 is encased, reducing or eliminating the possible contamination that could otherwise occur through the relief valve 132. The biocidal encasement 133 preferably has a porosity from about 8 to 80 (e.g. about 20–60) microns and is made up of iodinated resin media and retained in place by a porous plastic plug 134. As an alternative, the carbon of filter 120 can be made with porosity above 20–30 microns and self-vent, eliminating the need for the valve 132.

Figure 18:
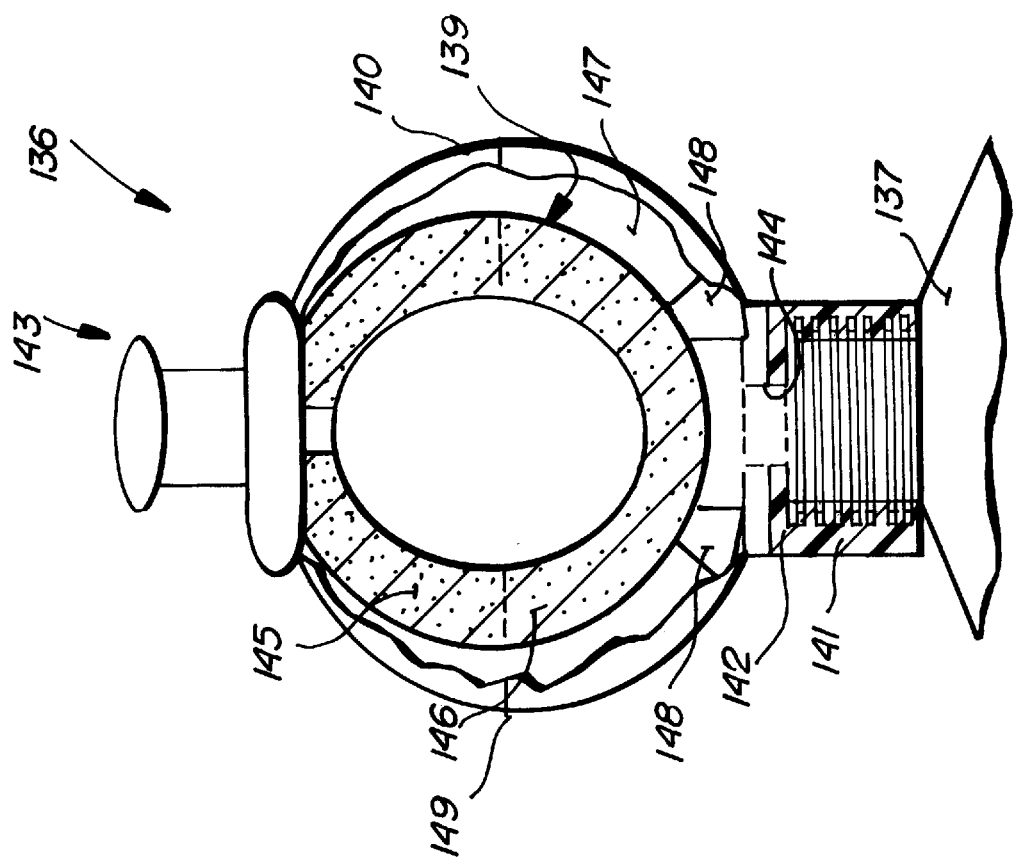
FIG. 18 is a side view, partly in cross-section, partly in elevation, and partly with components cut away for clarity of illustration, of a novelty type filter assembly, valve, and bottle top structure according to the present invention.

FIG. 18 illustrates another embodiment of a filter assembly 136 according to the present invention that is particularly adapted to be used as a novelty item, or for children, although it has other functional uses. In this embodiment the filter assembly 136 is, again, used with a conventional bottle 137 (such as a conventional squeeze bottle) having a circular cross-section neck 138 or open end. The assembly 136 includes a filter element shown generally by reference numeral 139 which is mounted within a housing 140. A cap 141 closes the circular neck or open end 138 of the bottle 137, the cap 141 having a top 142 of a first area. The housing 140 extends upwardly from and is operatively connected to the cap 141 top 142 and the housing 140 has a maximum cross-sectional area at least 20% larger than the cap top area 142, and typically two to ten times as large.

A manual valve 143 of any suitable configuration such as earlier described (in the embodiment illustrated in FIG. 18 the valve 143 being a conventional push-pull valve such as for a bike bottle) which is operable to be moved between an open position in which liquid may flow therethrough and a closed position in which liquid may not flow therethrough, is operatively connected to the filter element 139, e.g. being mounted on the top of and/or integral with the housing 140. The valve 143, cap 141, housing 140, and filter element 139 are positioned with respect to each other so that liquid flowing through the opening 144 in the top 142 of the cap 141 must pass through the housing 140, filter element 139, and valve 143 before being dispensed.

In the embodiment illustrated in FIG. 18 the housing 140 may be either substantially spherical, as shown in FIG. 19 which is a top plan view of the assembly 136. Also, in the FIG. 18 embodiment the filter element 139 is formed from two mating hemispherical sections 145, 146 which are preferably permanently joined together. The filter element 139 may be mounted within the housing 140 so as to define a generally spherical open volume 147 between the housing 140 and the exterior surface of the filter element 139. Two, three or more legs 148 may support the sections 145, 146 on the housing 140. A granular fill of media may be retained within the housing by porous plugs at either end.

The housing 140 may be configured as a cartoon character, golf ball, baseball, softball, or a wide variety of other physical objects, and the exact shape of the housing 140 may be contoured to facilitate this purpose (e.g. having surface manifestations, such as dimples like a golf ball, or projections like a nose, ears, or other facial features, or design elements formed thereon, such as the octagonal sections of a soccer ball or the seams in a baseball). The housing 140 too typically is two piece, having a parting line 149 at which the housing pieces are glued or otherwise attached together. Alternatively, a hollow one piece molding may be used with granulated media. The liquid from the bottle 137 is then dispensed as in the earlier embodiments, the liquid being filtered by the filter element 139 (e.g. a carbon/plastic matrix such as earlier described or a granular filtration media matrix) to remove chlorine and/or other contaminants.

FIG. 19 schematically illustrates exemplary decorative and surface manifestations such as may be provided on the housing 140, showing hair indicia 151 applied to make housing 140 look like a human head, and a projection 152 simulating a human's nose.

Figure 21:
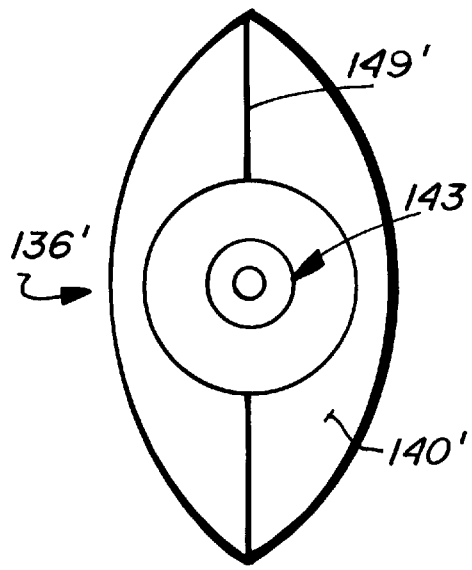
FIG. 21 is a top plan view of the structure of FIG. 20, without the bottle.

FIGS. 20 and 21 show a modification similar to that in FIGS. 18 and 19 only the particular shape of the housing and filter element are different. In this embodiment components identical to those in the FIGS. 18 and 19 embodiment are shown by the same reference numeral, while those which are similar but not identical are shown by the same reference numeral only followed by a "'".

In the embodiment of FIGS. 20 and 21 the housing 140' is substantially disc-shaped, or substantially bulging-disc-shaped, as can be seen in FIG. 21, and the filter element 139' is a standard cylindrical or tubular carbon/plastic block element or granular carbon such as described in earlier embodiments rather than having the hemispherical shape illustrated in FIG. 18. Again various surface manifestations and/or indicia may be applied to the exterior of the housing 140', and typically the housing 140' has a vertical part line 149' rather than a horizontal part line 149 in the FIGS. 18 and 19 embodiment. However it is not necessary for the construction of FIGS. 20 and 21 that the housing 140' be two part, and the filter 139' is of course one part. Simply by forming a large enough hole in the bottom of the housing 140' to receive the filter element 139', or by using granular activator carbon the housing 140' (whether spherical, or substantially disc-shaped or bulging-disc-shaped) may be made one piece.

FIG. 22 shows another variation of the bottle mounted filter assembly according to the present invention, the filter assembly in FIG. 22 being shown generally by reference 154. The filter assembly 154 is specifically for use in more confined spaces, or with containers having as small as a 28 mm neck opening. The filter mount 155 is designed to adapt to a straw, or bottle top as described in earlier embodiments. The outer wrap 156, is an inorganic fiber micro-micron biological filter which will retain greater than 99% of 3–6 micron particulate and biological elements. The purpose of this outer filter component 156 is to preclude the passage of protozoa cysts, and reduce turbidity and silt.

The next layer separating the center filter core 157, from the outer biological filter 156, is a fiber wrap 158, impregnated with iodinated resin, or other biocide. The purpose of this biocidal thin layer 158 is to preclude biological elements from "growing" through the 3–4 micron barrier filter. By bonding the biocidal material, or resin, to a cloth substrate the biocidal material is retained in place. The inside core 157, is a monolithic activated carbon filter formed in combination with polyethylene or styrene. Typically, the filter 157 will be from 40–80% carbon by volume and have a pore size between 10–120 microns. The filter media of the core filter 157 may also be of a granular nature. The media used may be activated carbon, as noted, or zeolyte type compounds, or highly reactive polymers for metals removal attached to a substrate.

A base plate 159 preferably supports the filter assembly 154 which is potted or bound to the base plate by the bonding compound 160.

Figure 23:
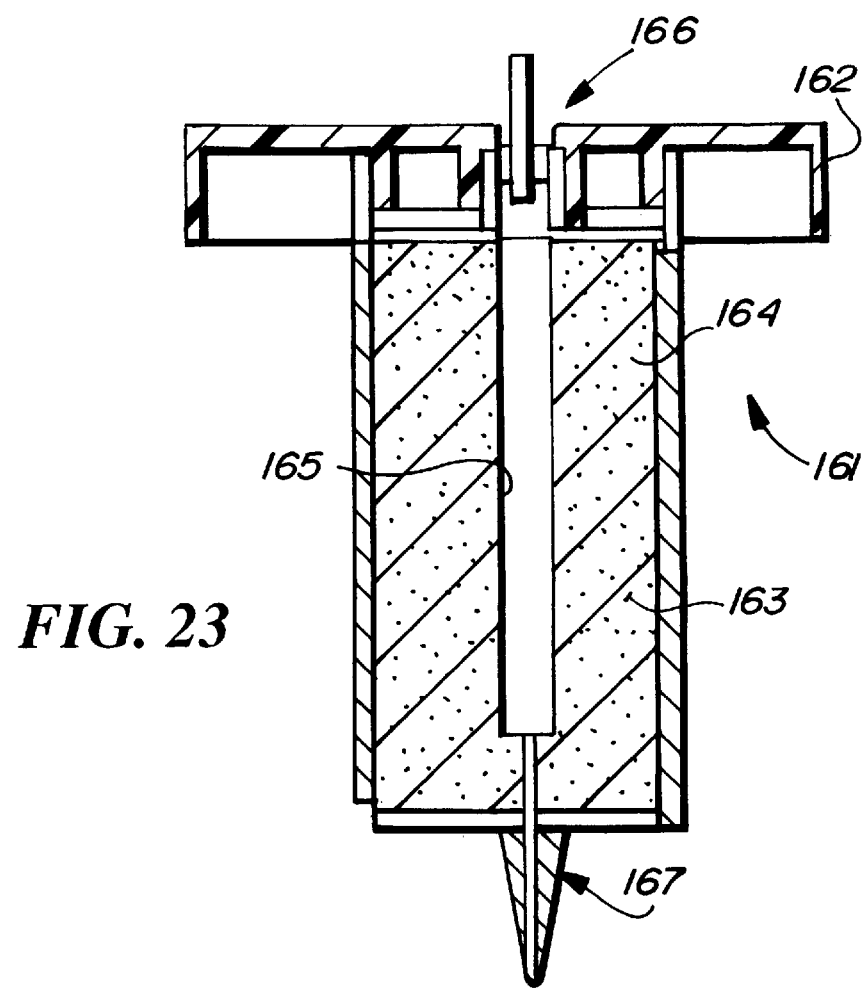
FIG. 23 is a side cross-sectional view of a modified filter assembly according to the invention that may be used in an inverted mode.

FIG. 23 shows a modified filter assembly 161 of radial flow design for use in an inverted mode (turned 180° about a horizontal axis from the orientation in the drawing) in conjunction with 2–5 gallon water bottles used in conjunction with a crock or cooler. When assembled to a filled water bottle, block filter 163 is held in place by cap 162 which snaps or is threaded to the bottle neck. The bottle filter assembly 161 is then inverted and water flows radially through the porous housing case 164 and filter element 163 into the hollow central annulus 165 and into the crock or cooler used to dispense the water. The water rises in the receiving crock, or cooler, unit the level of the water in the crock reaches the opening of the central water supply annulus at 166. The hollow central annulus 165 also provides an air passage to allow air to enter the crock or cooler filling the space evacuated by the water in the bottle feeding through the filter into the crock or cooler. The air entering the bottle is vented through the conventional air relief nozzle 167. The design of the air relief nozzle 167 is such as to preclude the entrapment of or the formation of an air bubble which would block the flow of air back into the container. An end dimension of 0.20"–0.050" has been determined to be satisfactory. Similarly, component 166 positioned in, and extending above the opening 165 is a rectangular shaped polygon with a single edge rising to the center. The purpose and effect of this component is to eliminate blockage at the water exit/air intake interface of annulus 165 by an air bubble.

Figure 24:
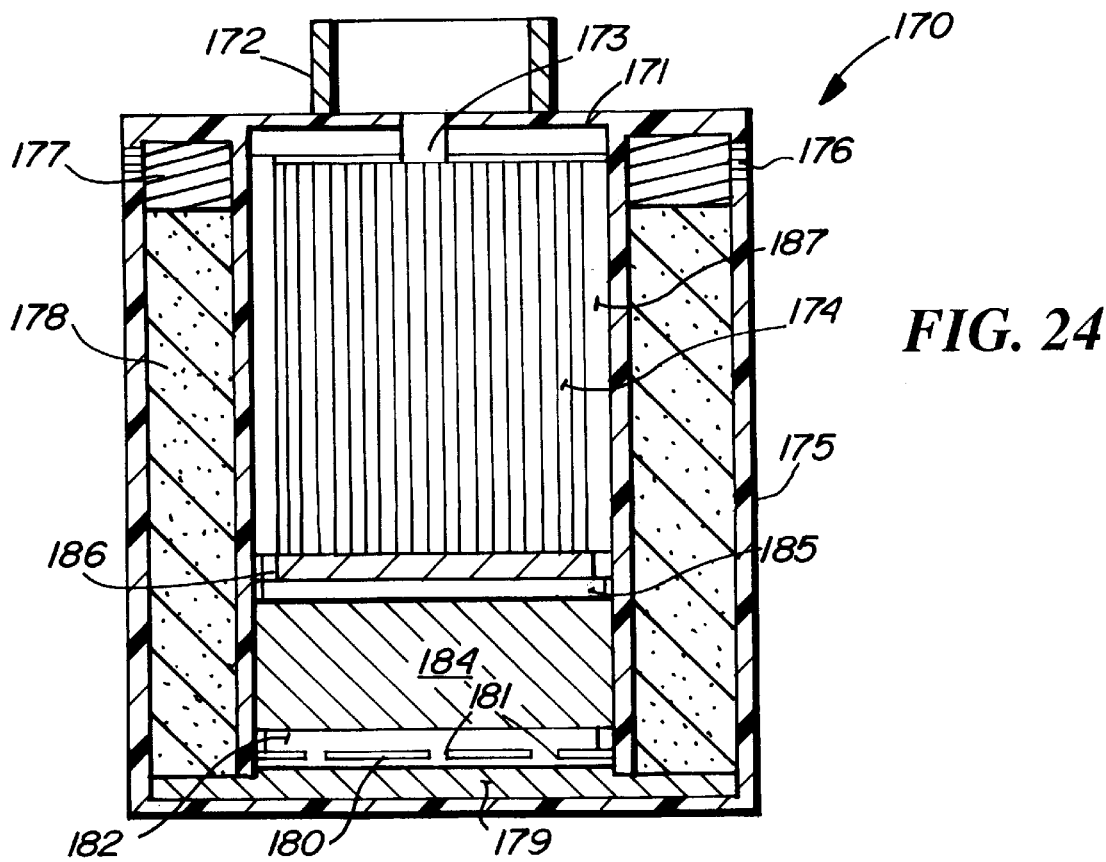
FIG. 24 is a side cross-sectional view of an exemplary high performance biological filter according to the present invention.

FIG. 24 illustrates a high performance biological filter assembly 170 with the capability of devitalizing virus and bacteria while filtering out protozoa of 3–4 microns in size. The filter assembly 170 also contains media effective in reducing taste, odor, chlorine, chemical contaminants and heavy metals. This filter assembly 170 is particularly unique as it is of relatively small size, designed to fit into sport type bottles, and jugs with neck openings as small as 53 mm and adapts readily to being enlarged to fit 63 mm and larger neck openings; yet functions under low pressure as exerted by sucking on the water outlet valve (typically similar to a pull-push top) and squeezing a plastic bottle with normal hand pressure. Depending upon the density (porosity in microns) the filter assembly 170 will self-vent air back into the bottle, or a bottle with an independent vent will be used. The filter assembly 170 may be assembled to a bottle closure with a valve as shown in FIG. 4a, or mounted to a bottle by a sealing flange as shown in other embodiments.

The filter end closure 171, has an extended annular mounting boss 172 for attachment to a cap, as to the ring 32 in the FIG. 4a embodiment. The product water exit orifice 173, interfaces with the unitized microfiber protozoa and cyst filter 174 which retains particles of 3–4 microns. Filter 174 is normally pleated but may also be of a straight cylindrical design. Outer shell 175 has radial openings 176 positioned below the closure 171, which is at the exit end of the filter bottom when inverted for drinking. The annular pre-filter 177 filters large particles and retains the biocidal media 178 in an outer filter annulus. The water to be treated flows radially from the bottle through openings 176, through pre-filter 177, and axially through the biocidal media 178 in annular form and into the porous media retaining filter 179. The partially treated water then passes radially through filter 179, into a shallow accumulation chamber 180, through base vents 181 and into a second accumulation chamber 182. The water flows axially through the porous media filter 184, comprising or consisting of carbon bonded with styrene or polyethylene. Styrene is used to bond metal removing polymers to the matrix forming a high performance filter incorporating lead, arsenic and/or radioactive contaminant removal. The mix of carbon to basic, or substrate, polymer is 35–85% by weight, with porosity between 10 and 100 microns. Flowing axially from the filter 184 the water enters an accumulation chamber 185 and flows through openings 186 spaced radially about the filter 174 end plate into the void annulus 187. From the void annulus 187 the water flows radially through the micro-porous fiber filter 174, exiting through orifice 173. As an alternative the carbon/polymer filter component 184 may be integrated with the microfiber filter 174 in the same manner as shown in FIGS. 1 and 2.

Figure 25:
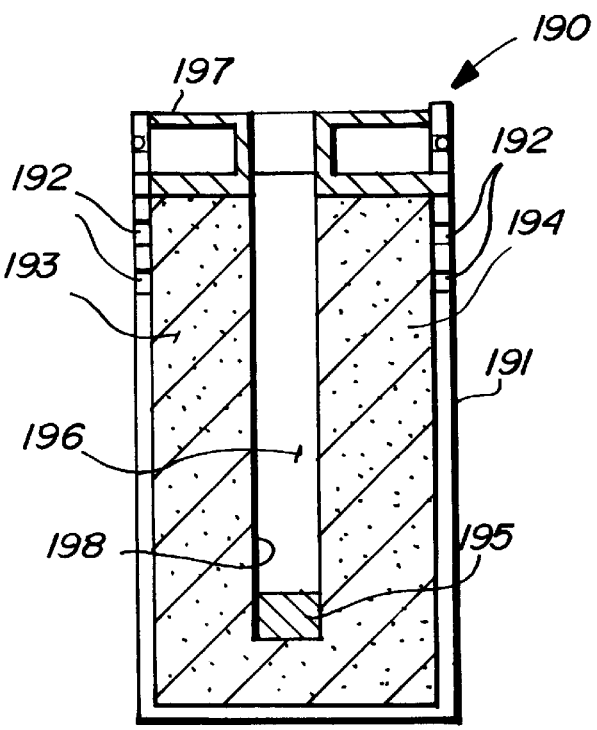
FIG. 25 is a side cross-sectional view of another exemplary filter assembly according to the present invention, which uses a pre-filter.

FIG. 25 shows a chlorine, taste, and odor filter assembly 190 with the external surface a plastic shell 191 open to a radial in-flow of water at the bottom end (when inverted) 192, an inner plastic cylindrical tube 198 open at the bottom forming an annulus within which the media 194 is retained, and a filter media consisting of or comprising typically granular activated carbon, or other appropriate filtration media(s) used singularly or in tandem. The water being treated passes through a retention pre-filter 193 and flows axially up into the annulus media chamber 194. The water is hence drawn through a retention screen 195 into the void area 196 to exit as filtered water. The filter assembly 190 mounts to a cap for a bottle via a mounting boss 197.

In any of the embodiments described above where a carbon black filter element is provided, the element may comprise a porous rigid matrix of at least 35% activated carbon (e.g. 35–85%), styrene, and metal removing polymer bound to the styrene such as for example removing lead, radioactive, or other toxic metals. The exact polymer utilized will depend upon the metal or metals most desirably removed. The desired porosity of such a rigid matrix is between about 10–100 microns, although depending upon the filter elements that it is used with, its porosity may be greater. Of course the element is dimensioned to fit within a bottle through the circular neck or open end thereof, as described with respect to the other embodiments (except for the embodiments of FIGS. 18 through 21) above.

It will thus be seen that according to the present invention advantageous and versatile filter assemblies are provided. While the invention has been herein shown and described in what is presently conceived to be the most practical and preferred embodiments it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A filter assembly for use with a bottle having a circular cross-section neck or open end, comprising:

an outer housing generally tubular in configuration and having openings or pores therein to allow the radial flow of liquid therethrough;

a fine filtration media disposed radially inwardly of said outer housing, said fine filtration media having a pore size of between about 1–6 microns, and comprising at least a first support filter element mounting a high efficiency particulate filter having at least 99% removal efficiency for particles between 3–4 microns, and passes the turbidity reduction test based on NSF53-1994, section 6.5.2;

an inner filtration media disposed radially inwardly of said fine filtration media, said inner filtration media including activated carbon;

said outer housing dimensioned to pass through the neck or open end of a bottle; and said outer housing, fine filtration media, and inner filtration media, being positionable in a bottle and with respect to each other so that liquid must pass through said outer housing, then said fine filtration media, and then said inner filtration media, before passing through the neck or open end of a bottle; and wherein said filter assembly has a pressure drop of less than three psi.

2. A filtration assembly as recited in claim 1 wherein said fine filtration media comprises a microfiber media formed of glass microfibers of varying cross-sectional diameters having a porosity of about 1–3 microns.

3. A filtration assembly as recited in claim 1 wherein said inner filtration media is tubular and wherein said assembly is connected to a cap having a manual valve.

4. A filter assembly as recited in claim 3 wherein said outer housing comprises an outer surface, a plurality of ribs, and an inner surface, said plurality of ribs having slots formed therein; and wherein the majority of said ribs each have an outer surface surface area at least 50% larger than said inner surface surface area.

5. A filter assembly as recited in claim 4 wherein said ribs are tapered from said outer surface to said inner surface so that they have a substantially triangular cross-section, with the outer surface forming the triangle base and the inner surface the apex.

6. A filter assembly as recited in claim 5 wherein said filter has an outer surface area; and wherein said ribs and slots are dimensioned so that at the area of said slots of said filter element at least about 75% of said outer surface area of said filter element can be contacted by liquid flowing through said slots.

7. A filter assembly as recited in claim 1 wherein said outer housing comprises an outer surface, a plurality of ribs, and an inner surface, said plurality of rib having slots formed therein; and wherein the majority of said ribs each have an outer surface surface area at least 50% larger than said inner surface surface area.

8. A filter assembly as recited in claim 1 wherein said inner filtration media comprises a porous rigid matrix of at least 35% activated carbon, styrene, and metal removing polymer bound to said styrene, said filter element having a porosity of between about 10–100 microns.

9. A filter assembly as recited in claim 1 disposed in a bottle having a circular cross-section neck or open end, and further comprising:
    a cap for closing the circular neck or open end of a bottle, said cap having a top of a first area;
    a filter element housing extending upwardly from and operatively connected to said cap top and having a maximum cross sectional area at least 20% larger than said cap top area;
    a manual valve operable to be moved between an open position in which liquid may flow therethrough and a closed position in which liquid may not flow therethrough, said manual valve operatively connected to said filter element; and
    said valve, cap, housing and filter element positioned with respect to each other so that liquid flowing through said cap must pass through said housing, filter element, and valve before being dispensed.

10. A filter assembly for use with a bottle having a circular cross-section neck or open end, comprising:
    an outer housing generally tubular in configuration and having openings or pores therein to allow the radial flow of liquid therethrough;
    a fine filtration media disposed radially inwardly of said outer housing, said fine filtration media having a pore size of between about 1–6 microns comprising a microfiber filter media formed of glass microfibers of varying cross-sectional diameters having a porosity of about 1–3 microns;
    an inner filtration media disposed radially inwardly of said fine filtration media, said inner filtration media including activated carbon;
    said outer housing dimensioned to pass through the neck or open end of a bottle; and
    said outer housing, fine filtration media, and inner filtration media, being positionable in a bottle and with respect to each other so that liquid must pass through said outer housing, then said fine filtration media, and then said inner filtration media, before passing through the neck or open end of a bottle.

11. A filtration assembly as recited in claim 10 wherein said fine filtration media comprises a high efficiency particulate filter having at least 99% removal efficiency for particles between 3–4 microns.

12. A filtration assembly as recited in claim 11 wherein said high efficiency particulate filter passes the turbidity reduction test based on NSF53-1994, section 6.5.2, and wherein said filter assembly has a pressure drop of less than three psi.

13. A filtration assembly as recited in claim 12 wherein said inner filtration media is tubular and wherein said assembly is connected to a cap having a manual valve.

14. A filtration assembly as recited in claim 11 wherein said inner filtration media is tubular and wherein said assembly is connected to a cap having a manual valve.

15. A filter assembly as recited in claim 11 wherein said inner filtration media comprises a porous rigid matrix of at least 35% activated carbon, styrene, and metal removing polymer bound to said styrene, said filter element having a porosity of between about 10–100 microns.

16. A filtration assembly as recited in claim 10 wherein said microfiber filter media is supported by first and second filter sheets each with a weight of at least about ½ oz per square yard sandwiching said microfiber filter media therebetween and adhered thereto.

17. A filtration assembly as recited in claim 16 wherein said filter sheets and adhered microfiber filter media have a pleated or accordion configuration.

18. A filtration assembly as recited in claim 17 wherein said at least first support filter sheet comprises first and second filter sheets each with a weight of at least about ½ oz per square yard sandwiching said microfiber filter media therebetween and adhered thereto.

19. A filtration assembly as recited in claim 16 wherein said first and second filter sheets each have a porosity of about 4–10 microns.

20. A filtration assembly as recited in claim 19 wherein said inner filtration media comprises a porous activated carbon, plastic matrix having a porosity of between about 10–150 microns.

21. A filtration assembly as recited in claim 20 wherein said inner filtration media is tubular and wherein said assembly is connected to a cap having a manual valve.

22. A filter assembly for use with a bottle having a circular cross-section neck or open end, comprising:
    an outer housing generally tubular in configuration and having openings or pores therein to allow the radial flow of liquid therethrough;
    a fine filtration media disposed radially inwardly of said outer housing, said fine filtration media having a pore size of between about 1–6 microns;
    an inner filtration media disposed radially inwardly of said fine filtration media, said inner filtration media including activated carbon;
    said outer housing dimensioned to pass through the neck or open end of a bottle and wherein said outer housing comprises an outer surface, a plurality of ribs, and an inner surface, said plurality of ribs having slots formed therein; and wherein the majority of said ribs each have an outer surface surface area at least 50% larger than said inner surface surface area; and
    said outer housing, fine filtration media, and inner filtration media, being positionable in a bottle and with respect to each other so that liquid must pass through said outer housing, then said fine filtration media, and then said inner filtration media, before passing through the neck or open end of a bottle.

23. A filter assembly as recited in claim 22 wherein said ribs are tapered from said outer surface to said inner surface so that they have a substantially triangular cross-section, with the outer surface forming the triangle base and the inner surface the apex.

24. A filter assembly as recited in claim 23 wherein said filter has an outer surface area; and wherein said ribs and slots are dimensioned so that at the area of said slots said filter element at least about 75% of said outer surface area of said filter element can be contacted by liquid flowing through said slots.

25. A filter assembly as recited in claim 22 wherein said inner filtration media comprises a porous rigid matrix of at least 35% activated carbon, styrene, and metal removing polymer bound to said styrene, said filter element having a porosity of between about 10–100 microns.

26. A filter assembly for use with a bottle having a circular cross-section neck or open end, comprising:

- an outer housing generally tubular in configuration and having openings or pores therein to allow the radial flow of liquid therethrough;
- a fine filtration media disposed radially inwardly of said outer housing, said fine filtration media having a pore size of between about 1–6 microns;
- an inner filtration media disposed radially inwardly of said fine filtration media, said inner filtration media comprising porous rigid matrix of at least 35% activated carbon, styrene, and metal removing polymer bound to said styrene and having a porosity of between about 10–100 microns;
- said outer housing dimensioned to pass through the neck or open end of a bottle; and
- said outer housing, fine filtration media, and inner filtration media, being positionable in a bottle and with respect to each other so that liquid must pass through said outer housing, then said fine filtration media, and then said inner filtration media, before passing through the neck or open end of a bottle.

27. A filtration assembly as recited in claim 26 wherein said fine filtration media comprises at least a first support filter element mounting a high efficiency particulate filter having at least 99% removal efficiency for particles between 3–4 microns.

28. A filtration assembly as recited in claim 27 wherein said high efficiency particulate filter comprises a microfiber filter media formed of glass microfibers of varying cross-sectional diameters having a porosity of about 1–3 microns.

29. A filtration assembly as recited in claim 28 wherein said first support filter element comprises one or more filter sheets adhered to said microfiber filter media.

30. A filter assembly as recited in claim 28 wherein said inner filtration media comprises a porous rigid matrix of at least 35% activated carbon, styrene, and metal removing polymer bound to said styrene, said filter element having a porosity of between about 10–100 microns.

31. A filter assembly disposed in a bottle having a circular cross-section neck or open end, comprising:

- an outer housing generally tubular in configuration and having openings or pores therein to allow the radial flow of liquid therethrough;
- a fine filtration media disposed radially inwardly of said outer housing, said fine filtration media having a pore size of between about 1–6 microns;
- an inner filtration media disposed radially inwardly of said fine filtration media, said inner filtration media including activated carbon;
- said outer housing dimensioned to pass through the neck or open end of a bottle;
- said outer housing, fine filtration media, and inner filtration media, being positionable in a bottle and with respect to each other so that liquid must pass through said outer housing, then said fine filtration media, and then said inner filtration media, before passing through the neck or open end of a bottle; and
- a cap for closing the circular neck or open end of a bottle, said cap having a top of a first area;
- a filter element housing extending upwardly from and operatively connected to said cap top and having a maximum cross-sectional area at least 20% larger than said cap top area;
- a manual valve operable to be moved between an open position in which liquid may flow therethrough and a closed position in which liquid may not flow therethrough, said manual valve operatively connected to said filter element; and
- said valve, cap, housing and filter element positioned with respect to each other so that liquid flowing through said cap must pass through said housing, filter element, and valve before being dispensed.

* * * * *